(12) United States Patent
Rumer

(10) Patent No.: US 10,595,373 B2
(45) Date of Patent: Mar. 17, 2020

(54) METHODS AND APPARATUSES TO PROVIDE DIMMING FOR A LIGHT EMITTING DIODE SYSTEM

(71) Applicant: Fulham Company Limited, George Town, Grand Cayman (KY)

(72) Inventor: Mark Rumer, Portland, OR (US)

(73) Assignee: FULHAM COMPANY LIMITED, George Town, Grand Cayman (KY)

(*) Notice: Subject to any disclaimer, the term of this patent is extended or adjusted under 35 U.S.C. 154(b) by 0 days.

(21) Appl. No.: 15/799,838

(22) Filed: Oct. 31, 2017

(65) Prior Publication Data
US 2019/0132923 A1    May 2, 2019

(51) Int. Cl.
H05B 33/08    (2006.01)

(52) U.S. Cl.
CPC ..... H05B 33/0851 (2013.01); H05B 33/0818 (2013.01); H05B 33/0845 (2013.01); H05B 33/0848 (2013.01); H05B 33/0854 (2013.01); H05B 33/0869 (2013.01)

(58) Field of Classification Search
CPC ............ H05B 33/0815; H05B 33/0833; H05B 33/0845; H05B 33/0851; H05B 33/0872
USPC ..................... 315/185 R, 307, 312
See application file for complete search history.

(56) References Cited

U.S. PATENT DOCUMENTS

| 6,094,014 A | 7/2000 | Bucks et al. |
|---|---|---|
| 6,577,512 B2 | 6/2003 | Tripathi et al. |
| 6,586,890 B2 | 7/2003 | Min et al. |
| 7,262,559 B2 | 8/2007 | Tripathi et al. |
| 7,615,974 B1 | 11/2009 | Xu |
| 7,642,734 B2 | 1/2010 | De Anna |
| 8,294,381 B2 | 10/2012 | Ge et al. |
| 8,786,213 B2 | 7/2014 | Yang et al. |
| 2007/0040512 A1 | 2/2007 | Jungwirth et al. |
| 2007/0200513 A1 | 8/2007 | Ha et al. |
| 2008/0238649 A1* | 10/2008 | Arszman ............... B60Q 1/503 340/471 |
| 2011/0057576 A1 | 3/2011 | Otake et al. |
| 2011/0084620 A1 | 4/2011 | Lee |

(Continued)

FOREIGN PATENT DOCUMENTS

| EP | 3113577 A1 | 1/2017 |
|---|---|---|
| WO | 2005059964 A2 | 6/2005 |

(Continued)

OTHER PUBLICATIONS

PCT International Search Report of Application No. PCT/US2018/058299, dated Jan. 31, 2019.

(Continued)

*Primary Examiner* — Tung X Le
(74) *Attorney, Agent, or Firm* — Womble Bond Dickinson (US) LLP

(57) ABSTRACT

A dimming light emitting diode (LED) system comprises an LED driver. A switch-mode power supply controller is coupled to the LED driver to drive an LED light source array. The LED driver is configured to output an LED drive command to the switch-mode power supply controller to dim the LED light source array based on one or more LED parameters. The one or more LED parameters include a photometric response parameter, a gamma parameter, an aging parameter, a temperature parameter, or any combination thereof.

28 Claims, 8 Drawing Sheets

FIG. 5

(56) References Cited

U.S. PATENT DOCUMENTS

| | | |
|---|---|---|
| 2012/0194079 A1 | 8/2012 | Clauberg et al. |
| 2012/0319619 A1 | 12/2012 | Zhao |
| 2013/0016310 A1* | 1/2013 | Kanemitsu ......... H05B 33/0818 349/69 |
| 2013/0057165 A1 | 3/2013 | Ide et al. |
| 2013/0069545 A1 | 3/2013 | Seo |
| 2013/0249419 A1 | 9/2013 | Zhang et al. |
| 2014/0009081 A1 | 1/2014 | Fujiwara |
| 2014/0225529 A1 | 8/2014 | Beczkowski |
| 2014/0292220 A1 | 10/2014 | Trattler |
| 2015/0022110 A1 | 1/2015 | Sisto |
| 2015/0076999 A1 | 3/2015 | Malinin et al. |
| 2015/0108908 A1* | 4/2015 | Denvir ............... H05B 33/0815 315/186 |
| 2015/0377699 A1* | 12/2015 | Ho ..................... G01J 1/32 250/208.2 |
| 2015/0382424 A1 | 12/2015 | Knapp et al. |
| 2016/0330808 A1* | 11/2016 | Brandt ............... H05B 33/0845 |
| 2016/0366740 A1 | 12/2016 | Mio |
| 2017/0064796 A1* | 3/2017 | Rumer ............... H05B 37/0272 |
| 2017/0101052 A1 | 4/2017 | Nagao |
| 2017/0347417 A1 | 11/2017 | Chen |
| 2017/0347419 A1 | 11/2017 | Cusey |

FOREIGN PATENT DOCUMENTS

| | | |
|---|---|---|
| WO | 2009011898 A2 | 1/2009 |
| WO | 2013053861 A1 | 4/2013 |

OTHER PUBLICATIONS

PCT Written Opinion of Application No. PCT/US2018/058299, dated Jan. 31, 2019.

PCT International Search Report and Written Opinion of Application No. PCT/US2018/058300, dated Feb. 15, 2019.

* cited by examiner

METHODS AND APPARATUSES TO PROVIDE DIMMING FOR A LIGHT EMITTING DIODE SYSTEM

FIELD

Embodiments relate to the field of light emitting diode (LED) systems. More specifically, the embodiments relate to a dimming LED system.

BACKGROUND

Typically, a dimming LED circuit, such as a LED driver, is used to control the brightness of LEDs. LEDs are increasingly being used instead of incandescent bulbs. LEDs provide several advantages over conventional light sources, which include lower energy consumption, longer lifetime, improved physical robustness, smaller size, and faster switching.

Dimming LED circuits have several methods to control the brightness of LEDs. One method is pulse width modulation (PWM) dimming. PWM dimming switches a switch to control the average of LED current supplied to the LEDs. Another method is direct-current (DC) dimming. DC dimming controls the LED current that is supplied to the LEDs. An alternative method is combining PWM and DC dimming.

Dimming LED circuits can, however, present several disadvantages. One disadvantage of a dimming LED circuit is unpredictable operation across multiple LEDs of the same installation. Other disadvantages encountered with a dimming LED circuit are the limited number of parameters that are available and the inconsistency of the parameters. Typically, some of the parameters include photometric response, LED temperature, LED color output over time, gamma variation, and LED intensity variation.

Another disadvantage of conventional dimming LED circuits is that LEDs usually have shortened lifetimes. Typically, the LED input power of the dimming LED circuit is increased as the LED drive respectively increases the brightness of the LEDs to a desired luminance level. This increased LED drive reduces the overall LED source lifetime and thus leads to additional replacements and increased costs.

SUMMARY

Methods and apparatuses to provide adaptive dimming, temperature compensation, lumen maintenance, and gamma compensation for a light emitting diode (LED) system are described. For one embodiment, a dimming light emitting diode (LED) system comprises an LED driver and a switch-mode power supply controller coupled to the LED driver to drive an LED light source array. The LED driver is configured to output an LED drive command to the switch-mode power supply controller to dim the LED light source array based on one or more LED parameters. The one or more LED parameters include a photometric response parameter, a gamma parameter, an aging parameter, a temperature parameter, or any combination thereof.

For one embodiment, a dimming light emitting diode (LED) driver circuit comprises a memory and a dimming control unit comprising a processor coupled to the memory. The processor is configured to output a command to drive an LED light source array based on one or more LED parameters. The one or more LED parameters include a photometric response parameter, a gamma parameter, an aging parameter, a temperature parameter, or any combination thereof.

For one embodiment, a method to dim an LED source array comprises receiving an input to dim the LED source array and outputting an LED drive command in response to the input based on one or more LED parameters. The one or more LED parameters include a photometric response parameter, a gamma parameter, an aging parameter, a temperature parameter, or any combination thereof.

For one embodiment, a non-transitory machine readable medium comprises instructions that cause a data processing system to perform a method to dim an LED source array that comprises receiving an input to dim the LED source array and outputting an LED drive command in response to the input based on one or more LED parameters. The one or more LED parameters include a photometric response parameter, a gamma parameter, an aging parameter, a temperature parameter, or any combination thereof.

Other advantages and features will become apparent from the accompanying drawings and the following detailed description.

BRIEF DESCRIPTION OF THE DRAWINGS

Embodiments described herein illustrated by way of example and not limitation in the figures of the accompanying drawings, in which like references indicate similar features. Furthermore, some conventional details have been omitted so as not to obscure from the inventive concepts described herein.

DETAILED DESCRIPTION

Figure 1:
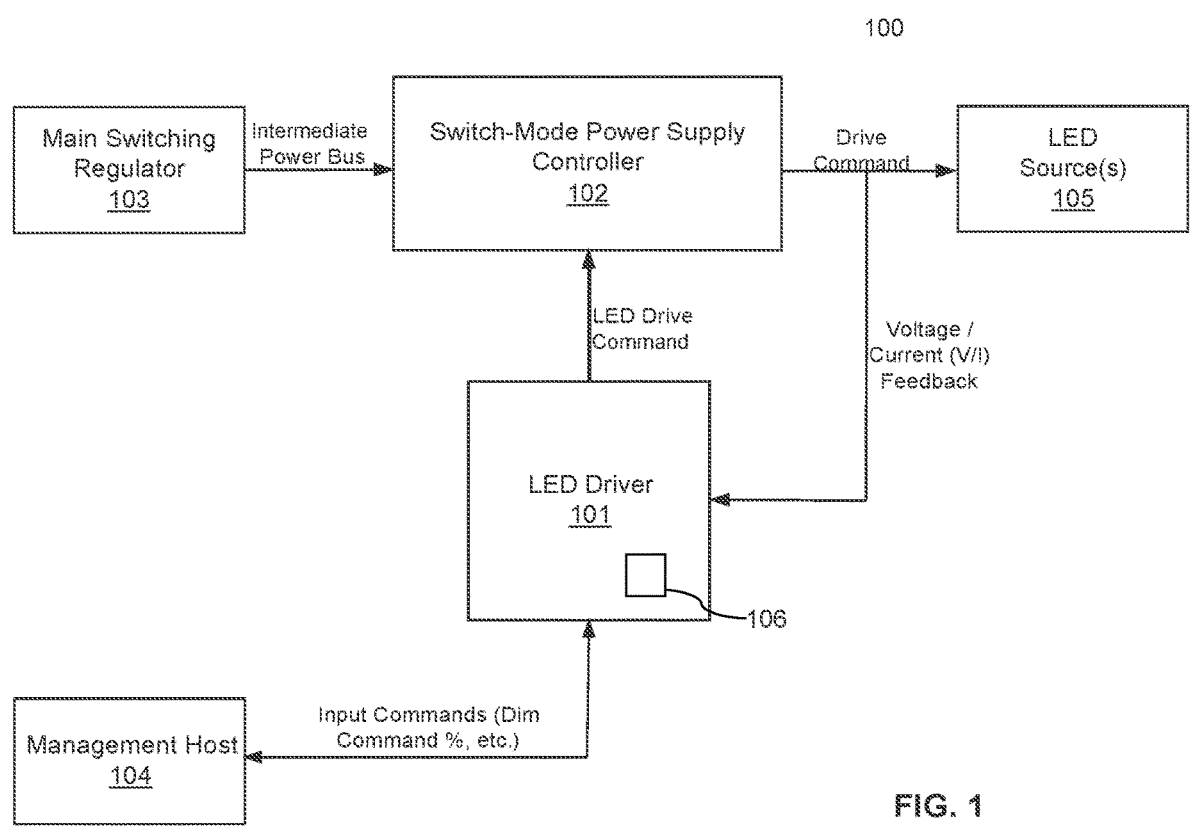
FIG. 1 is a block diagram of a dimming LED system according to one embodiment.

Methods and apparatuses to provide adaptive dimming, temperature compensation, lumen maintenance, and gamma compensation for a light emitting diode (LED) system are described. A dimming light emitting diode (LED) system comprises an LED driver and a switch-mode power supply controller coupled to the LED driver to drive an LED light source array. The LED driver is configured to output an LED drive command to the switch-mode power supply controller to dim the LED light source array based on one or more LED parameters. The one or more LED parameters include a photometric response parameter, a gamma parameter, an aging parameter, a temperature parameter, or any combination thereof.

For one embodiment, the LED driver of the dimming LED system includes a microcontroller and/or a digital signal processor (DSP). The microcontroller and DSP are configured to perform dimming methods that combine LED aging characteristics, LED temperature characteristics and LED dimming curve characteristics to stabilize an output of a light source. The light source is an LED source array that comprises a plurality of light emitting diodes (LEDs).

The LED driver includes a processor that compensates for parameters affecting the perceived quality of light over time, temperature, and drive level through the use of an interpolated table of performance parameters. For one embodiment, the performance parameters include a photometric response parameter, a gamma parameter, an aging parameter, a temperature parameter, a photometric feedback from the light source, a colormetric feedback from the light source, or any combination thereof. The photometric response parameter represents the light source characteristic that includes a human perceived intensity of the light source versus desired drive parameters of the light source (e.g., a drive voltage parameter, a drive current parameter and a duty cycle parameter). The gamma parameter represents the light source characteristic that includes a variation of the light source intensity across a drive level. The temperature parameter represents the light source characteristic that includes an intensity variation of the light source with respect to an operating temperature of the light source. The aging parameter represents a lumen maintenance characteristic that includes the light source intensity degradation over time. The photometric feedback from sensors in the LED source array, the colorimetric feedback from the sensors in the LED source array, or both the photometric feedback and the colorimetric feedback are used to compensate for the light intensity variation of the output of the LED source array and to indicate failure in the LED source array when operational parameters of the LED source array exceed predetermined thresholds. The dimming apparatuses and systems described herein are implemented as hardware, firmware, or a combination of hardware and firmware.

Dimming methods and systems described herein beneficially provide consistent performance across multiple luminaires (e.g., LEDs) in an LED installation (e.g., LED light source array). Embodiments of the dimming methods and apparatuses described herein beneficially provide a consistent color output over time, temperature, and dimming level for multi-channel color mixing applications. The dimming methods and apparatuses described herein beneficially provide longer light source lifetime comparing to conventional techniques. This is achieved by providing the minimum amount of drive for a desired luminance level of the light source while reducing the effects of aging of the light source.

FIG. 1 shows a block diagram of a dimming LED system 100. The dimming LED system 100 includes an LED driver 101, a switch-power supply controller 102, a main switching regulator 103, a management host 104, and a light source 105. For one embodiment, light source 105 is an LED source array comprising a plurality of LEDs. The LED driver 101 receives one or more input commands to dim the light source 105 from the management host 104. The management host 104 comprises a processor that sends the one or more input commands to the LED driver 101 to dim the light source 105 to a predetermined percentage. Dimming refers to the reduction in a measured lumen output relative to a predetermined lumen output and is defined by a dimming ratio (e.g., dimming percentage). The input command includes a desired dimming ratio. As shown in FIG. 1, LED driver 101 is connected to management host 104 by a two-way communication link. For one embodiment, LED driver 101 includes a processor 106. For one embodiment, LED driver 101 includes a microcontroller, a DSP, or both a microcontroller and a DSP. The LED driver 101 outputs an LED drive command to the switch-mode power supply controller to dim the LED light source array in response to receiving the one or more input commands from the management host 104. The LED driver 101 determines a target dimming ratio based on the input command to dim to a desired percentage and one or more LED performance parameters and outputs the LED drive command based on the target dimming ratio. For one embodiment, the one or more LED performance parameters include a photometric response parameter, a gamma parameter, an aging parameter, a temperature parameter, a colormetric feedback from the light source 105, a photometric feedback from the light source 105, or any combination thereof. Dimming LED Driver 101 performs gamma compensation and determines a target dimming ratio based upon an input command to dim to a certain percentage, target intensities of the light source 105 associated with the one or more LED parameters identified in tables, and optional photometric feedback from the light source 105, as described in further detail below.

An input command to dim the light source 105 to a desired intensity is provided by a control network. Management host 104 represents a control network. For one embodiment, the LED drive level is selected by interpolating between the closest values in gamma, aging, and temperature compensation tables. For one embodiment, the gamma, aging, and temperature compensation tables are programmed with photometric response, aging, and temperature characteristic curves specific to the driven LED source array, as described in further detail below.

A photometric sensor collocated with the light source 105 provides a feedback to the LED driver 101. LED driver 101 computes an error value and adds the error value to the drive level value that compensates for intensity variation and source aging from one light source to another light source. If the error value exceeds a predetermined threshold, the control network is notified so that maintenance may be performed.

As shown in FIG. 1, the switch-mode power supply controller 102 receives an output from main switching regulator 103. The output of the main switching regulator signal is an intermediate power bus output. The switch-mode power supply controller 102 outputs a drive command to drive the light source 105 based on the LED command send from the LED driver 101 and the intermediate power bus signal. For one embodiment, the switch-mode power supply controller 102 comprises a two-channel buck converter. The buck converter is a DC-to-DC power converter that steps down voltage while stepping up current from its input (e.g., power supply) to its output (e.g., load).

As shown in FIG. 1, feedback data from the light source 105 are sent back to the LED driver 101. For one embodiment, the feedback data include a driving voltage, a driving current, a driving duty cycle, or any combination thereof.

The LED driver 101 outputs the LED drive command based one or more tables (not shown in FIG. 1) that map the one or more LED parameters to at least one of a drive voltage parameter, a drive current parameter and a duty cycle parameter, as described in further detail below. The LED driver 101 interpolates between at least two values of the one or more LED parameters. The LED driver 101 computes an error value for the one or more LED parameters.

The LED driver 101 receives an input LED setting information and determines compensation values according to the received input LED setting information and the one or more LED parameters. The LED driver 101 generates an output LED setting information based on the compensation values. The LED driver 101 determines a target dimming ratio based on target intensities of the LED source array associated with the one or more LED parameters, as described in further detail below.

Figure 2:
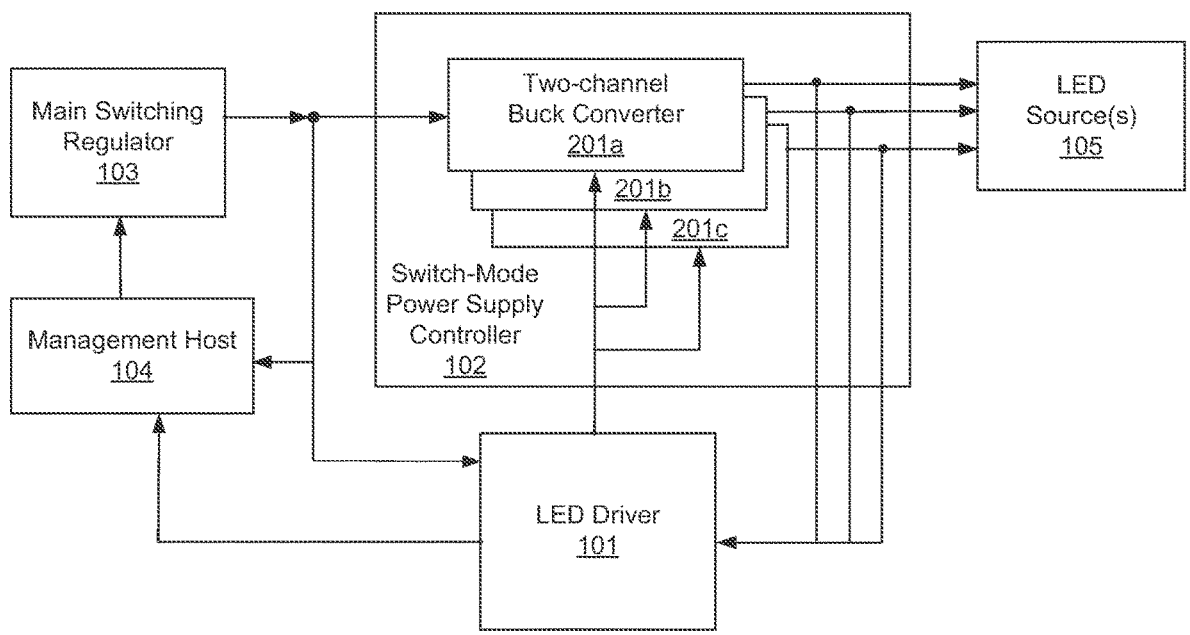
FIG. 2 is a block diagram of a dimming LED system, according to one embodiment.

FIG. 2 is a block diagram of a dimming LED system 200. Dimming LED system 200 includes LED driver 101, switch-power supply controller 102, main switching regulator 103, management host 104 and light source 105 that are described above with respect to FIG. 1. As shown in FIG. 2, switch-power supply controller 102 includes daughter cards 201a, 201b and 201c. The daughter card refers to a printed circuit board that plugs into another printed circuit board, which plugs into a main circuit board (motherboard).

For one embodiment, each of the daughter cards 201a, 201b and 201c includes a two-channel DC/DC buck converter. The two-channel DC/DC buck converters of the daughter cards 201a, 201b and 201c have the same designs.

As shown in FIG. 2, each of the switch-mode power supply controller 102, LED driver 101 and management host 104 receives an output of the main switching regulator 103. The LED driver 101 outputs an LED drive command to each of the two-channel buck converters 201a, two-channel buck converter 201b and two-channel buck converter 201c to dim the LED light source 105. The LED driver 101 determines a target dimming ratio based on the input command from the management host 104 to dim to a desired percentage and one or more LED performance parameters. The LED driver 101 outputs the LED drive command based on the target dimming ratio. For one embodiment, the one or more LED parameters include a photometric response parameter, a gamma parameter, an aging parameter, a temperature parameter, a colormetric feedback from the LED source 105, a photometric feedback from the LED source 105, or any combination thereof, as described above.

As shown in FIG. 2, the output of the main switching regulator 103 is fed into the switch-mode power supply controller 102, LED driver 101, and management host 104. As shown in FIG. 2, each of the two-channel buck converters of the daughter cards 201a, 201b and 201c provides an output drive signal to the LED source 105. The LED driver 101 provides an input drive signal to each of the two-channel DC/DC converters of the daughter cards 201a, 201b, and 201c, as shown in FIG. 2. The output drive signal from each of the two-channel DC/DC converters of the daughter cards 201a, 201b and 201c is fed back to the LED driver 101. As shown in FIG. 2, the LED driver 101 controls each of the two-buck converters of the daughter cards 201a, 201b and 201c based on the output current and output voltage of the output drive signal.

The DSP of the LED driver 101 controls the 6 channel DC/DC output of the switch-mode power supply controller to a pre-determined voltage level, a predetermined current level, or the predetermined voltage level and the predetermined current level. The DSP of the LED driver 101 senses an output current and an output voltage of each channel of the DC/DC buck converters, calculates a target pulse-width modulation (PWM) signal combining the programming signal for an output voltage and/or an output current to drive each channel of the buck converters of the switch-mode power supply controller 102. For one embodiment, the DSP of the LED driver 101 reports the sensing information and operating status to management host 104.

Figure 3:
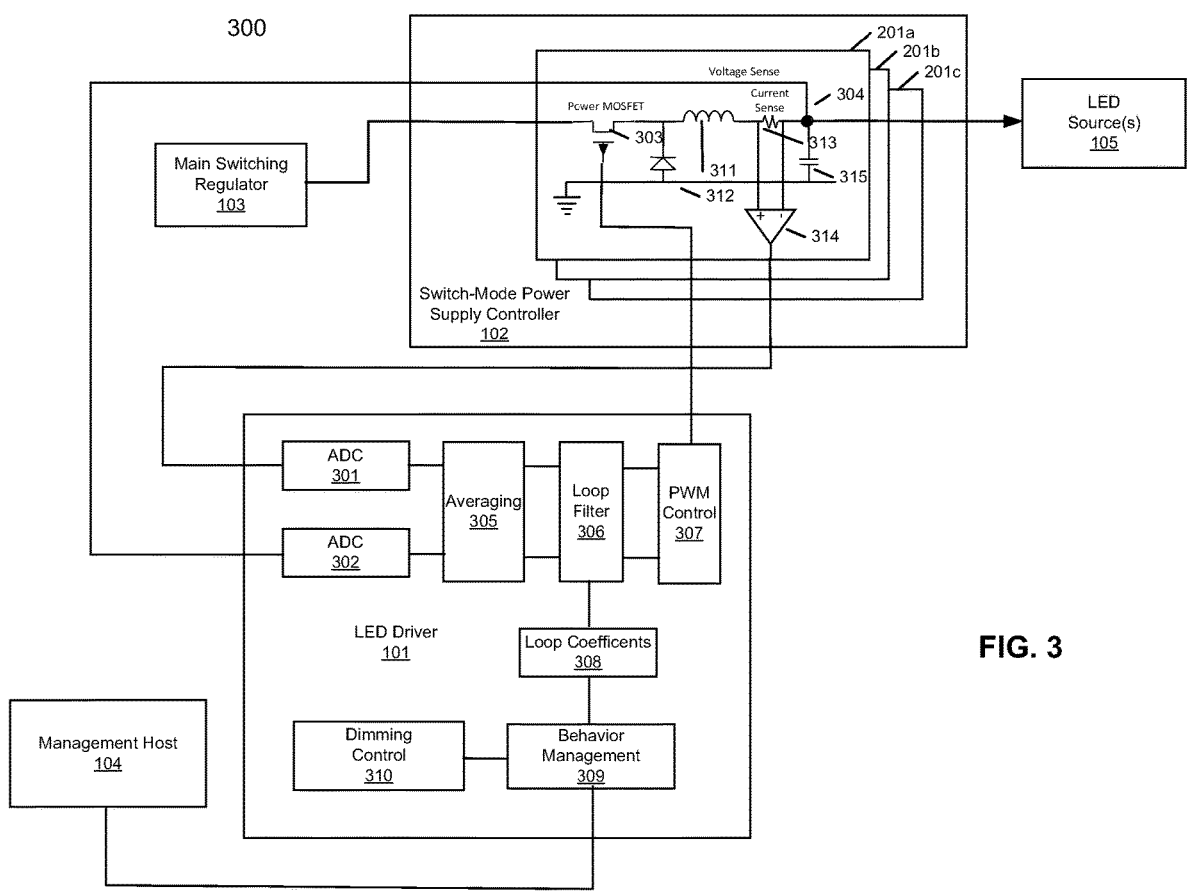
FIG. 3 is a block diagram of a dimming LED system according to one embodiment.

FIG. 3 is a block diagram of a dimming LED system 300 according to one embodiment. Dimming LED system 300 includes LED driver 101, switch-power supply controller 102, main switching regulator 103, management host 104 and light source 105 as above with respect to FIGS. 1 and 2. As shown in FIG. 3, switch-power supply controller 102 includes daughter cards 201a, 201b and 201c, as described above with respect to FIG. 2. System 300 is implemented as hardware, firmware, or a combination of hardware and firmware.

As shown in FIG. 3, each of the daughter cards 201a, 201b and 201c includes a two-channel DC/DC buck converter, as described above with respect to FIG. 2. The two-channel DC/DC buck converters of the daughter cards 201a, 201b and 201c have the same designs. As shown in FIG. 3, the two-channel DC/DC buck converter 201a includes a power metal oxide semiconductor field effect transistor (MOSFET) 303 coupled to an inductor 311 and a diode 312. A current sense resistor 313 is coupled to the inductor 311 and to an amplifier 314.

LED driver 101 has a DSP sub-system for each of the two-channel DC/DC buck converters of the daughter cards 201a, 201b, and 201c. As shown in FIG. 3, the DSP sub-system of the LED driver 101 includes an analog-to-digital converter (ADC) 301 and an ADC 302, an averaging function block 305, a control loop filter block 306, a pulse width modulation (PWM) control block 307, a loop coefficients block 308, a behavior management block 309, and a dimming control block 310.

The ADC block 301 is an analog to digital converter that resides in the digital signal processor integrated circuit of the LED driver 101 to convert a drive current representation of the LED light source 105 to a digital value. The ADC block 302 is an analog-to-digital converter that resides in the digital signal processor integrated circuit of the LED driver 101 to convert an anode voltage representation of the LED light source 105 to a digital value. As shown in FIG. 3, ADC block 301 is connected to the output of the amplifier 314 of the switch-mode power supply controller 102. ADC block 302 is connected to the node 304 of the switch-mode power supply controller 102.

The resulting values of the ADC block 301 and the ADC block 302 are then digitally filtered via an averaging algorithm of the averaging function block 305 to reduce noise and digital conversion alias artifacts. These averaged and filtered values are then presented to control loop filter block 306 which determines the proper pulse width to be applied to the PWM control block 307 based upon target voltage and current drive characteristics and control loop response behavior coefficients provided by the loop coefficients block 308.

As shown in FIG. 3, the PWM control block 307 provides a switch control signal for the power MOSFET of the LED channel of the corresponding buck converter (e.g., residing on daughter card 201a). The proportional period of time the switch is ON is determined by results from the loop filter block 306. As shown in FIG. 3, the behavior management block 309 is connected to the dimming control block 310, loop coefficients block 308 and management host 104. Behavior management block 309 controls loop coefficients block 308 based on an output of the dimming control block 310, and an output of the management host 104. When at least one of an average sensed drive voltage and an average sensed drive current is below a target value, the loop filter block 306 demands increasing a portion of ON-time from PWM Control 307. When at least one of an average sensed drive voltage and an average sensed drive current exceeds a target value, the loop filter block 306 demands decreasing a portion of ON-time from PWM Control 307. Under normal operational conditions, equilibrium is attained and only minor adjustments to the portion of ON-time from PWM Control 307 are required.

As shown in FIG. 3, when the power MOSFET 303 turns ON, the DC power of the main switching regulator output applies to inductor 311, current sense resistor 313, and the LED source 105 (load). Inductor 311 is energized and behaves as a voltage drop on the LED source 105. The diode 312 is reverse biased. Then power MOSFET 303 turns OFF, and inductor 311 releases the energy that was previously stored to the LED source 105 and diode 312. By controlling the ON/OFF state of the power MOSFET 303 the expected output current and voltage values can be achieved. The controlling the ON/OFF state of the power MOSFET 303 is realized by the DSP of the LED driver 101. The DSP of the LED driver 101 senses the output current through current sense resistor 313 and senses the output voltage through node 304, and controls the transistor 303. An amplified sensed current signal is sent through an amplifier 314 to ADC 301 of the LED driver 101. A sensed voltage signal is sent to ADC 302 of the LED driver 101, as shown in FIG. 3.

The DSP sub-system circuits of the LED driver 101 are configured to control six output channels of the DC/DC buck converters of the switch-mode power supply controller 102 to be at a pre-determined drive voltage level and a predetermined drive current level. Each of the DSP sub-system circuits of the LED driver 101 senses the output current and the output voltage of the corresponding DC/DC buck converter of the switch-mode power supply controller, calculates the demand PWM signal that combines the programming signal for the output voltage and current and outputs the PWM signal to drive the corresponding channel of the DC/DC buck converters.

The DSP sub-system of the LED driver 101 reports the sensing information and operating status to the management host 104. The DSP sub-system of the LED driver 101 senses the front end bus voltage (input for the buck circuit). The DSP sub-system of the LED driver 101 adjusts the front end bus voltage according to the load condition.

Figure 4:
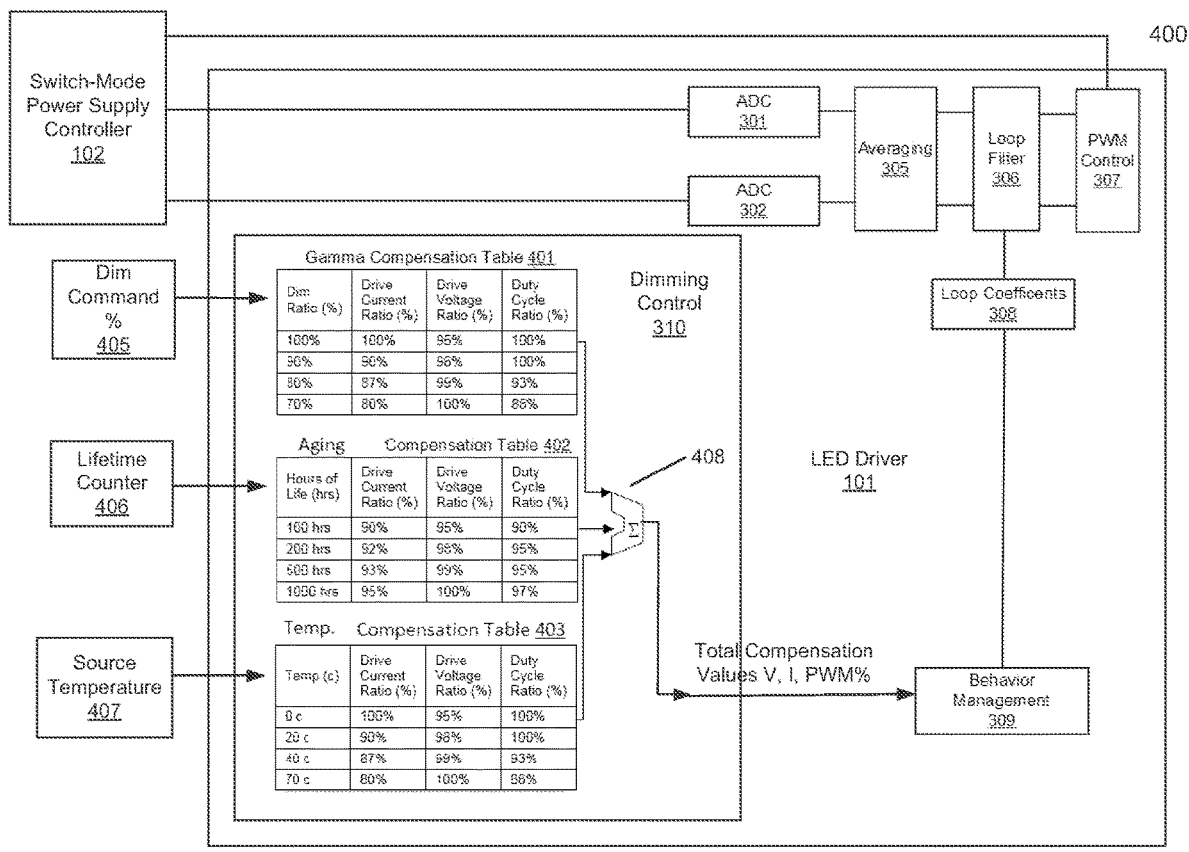
FIG. 4 is a block diagram of a dimming LED system according to one embodiment.

FIG. 4 is a block diagram of a dimming LED system 400 according to one embodiment. The dimming LED system 400 includes LED driver 101 coupled to switch-mode power supply controller 102, as described above. As shown in FIG. 4, the LED driver 101 includes ADC 301, ADC 302, averaging function block 305, control loop filter block 306, PWM control block 307, loop coefficients block 308, behavior management block 309 and dimming control block 310, as described above with respect to FIG. 3. ADC 301 and ADC 302 and PWM control block 307 are connected to switch-mode power supply controller 102, as described above.

As shown in FIG. 4, dimming control block 310 includes a gamma compensation table 401, an aging compensation table 402 and a temperature compensation table 403. Gamma compensation table 401 maps target values of a drive current ratio (%), a drive voltage ratio (%) and a duty cycle ratio (%) needed to drive the LED light source to obtain target values of a dimming ratio (%) of the LED light source. Target values of a drive current ratio (%), a drive voltage ratio (%) and a duty cycle ratio (%) are selected using the gamma compensation table 401 based on a dimming command 405 from a management or control host (e.g., management host 104).

For a non-limiting example, the dimming command includes a dimming ratio of 80% is received. In response to this dimming command, a drive current ratio of 87%, a drive voltage ratio of 99%, and a duty cycle ratio of 93% that correspond to the dimming ratio of 80% are selected as an output from the gamma compensation table 401.

Aging compensation table 402 maps target values of a drive current ratio (%), a drive voltage ratio (%) and a duty cycle ratio (%) needed to drive the LED light source that correspond to the target age (e.g., hours of life) of the LED light source. For one embodiment, target values of a drive current ratio (%), a drive voltage ratio (%) and a duty cycle ratio (%) are selected using the aging compensation table 402 based on an input from a lifetime counter 406. For one embodiment, lifetime counter 406 is an internal lifetime counter. For another embodiment, lifetime counter 406 is an external lifetime counter.

For a non-limiting example, the input from the lifetime counter 406 indicating that the age of the LED light source is 200 hours is received. In response to this input, a drive current ratio of 92%, a drive voltage ratio of 98%, and a duty cycle ratio of 95% that correspond to the 200 hours of life are selected as an output from the aging compensation table 402.

Temperature compensation table 403 maps target values of a drive current ratio (%), a drive voltage ratio (%) and a duty cycle ratio (%) needed to drive the LED light source that correspond to the target temperature of the LED light source. Values of a drive current ratio (%), a drive voltage ratio (%), and a duty cycle ratio (%) are selected using the temperature compensation table 403 based on an input from a source temperature block 407. Source temperature block 407 represents an external temperature sensor.

For a non-limiting example, the input from the source temperature block 407 indicating that the temperature of the LED light source is 40 degrees C. is received. In response to this input, a drive current ratio of 87%, a drive voltage ratio of 99%, and a duty cycle ratio of 93% that correspond to the temperature of 40 degrees C. are selected as an output from the temperature compensation table 403.

That is, the target values of the PWM duty-cycle, drive voltage, and drive current to drive the LED light source are selected based on the source aging and temperature characteristics and Gamma correction using compensation tables 401, 402 and 403. This beneficially extends the useful life of the light source and ensures optical consistence over service.

Each of the compensation tables 401, 402 and 403 has an arbitrary number of entries. A linear interpolation between the two nearest table entries is performed to ensure smooth transition across the dimming range. For one embodiment, the drive voltage, the drive current, and driving duty cycle are modified with modifier values that take into account the LED source aging.

As shown in FIG. 4, the output compensation values of the drive current ratio, the drive voltage ratio and the duty cycle ratio from each of the tables 401, 402, and 403 are summed at a summation block 408 that outputs total compensation values for the drive current ratio, the drive voltage ratio and the duty cycle ratio to behavior management block 309.

For one embodiment, a hybrid method of controlling dimming of an LED light source to compensate for the human photometric response, increase the source's useful life span, compensate for device tolerance variation, and nonlinearities in the LED source response to voltage, current, temperature, and aging is described. The system includes a digital signal processor (DSP) based switch mode power supply controller with firmware to implement parametric source compensation and life extension algorithms. The firmware modifies LED drive voltage and current according to desired dimming level according to tables describing operational characteristics. Optional sensors may be provided to measure operational characteristics to further compensate for accumulated errors, and provide feedback to control and management applications when operational parameters are exceeded.

For one embodiment, a dimming command is received from one or more control interfaces. Firmware in the DSP validates the command, then selects and interpolates values of the two closest entries in a table representing human photometric response and LED luminance characteristics with respect to a drive voltage and current, indexed by dimming ratio. The amount of LED drive current, drive voltage percentage is modified according to this interpolation. Meanwhile, another table represents luminance characteristics of the LED source with respect to temperature, and yet another table represents luminance with respect to operational lifetime. All these results are summed to modify the LED drive voltage and current to normalize the affect of these characteristics. For one embodiment, a sensor co-located with the LED source measures at least one of resulting luminance and color and provides a feedback to the LED driver which then further modifies the drive level. If the deviation of the driving parameter exceeds a predetermined amount, error information is passed to the control and management application.

Figure 5:
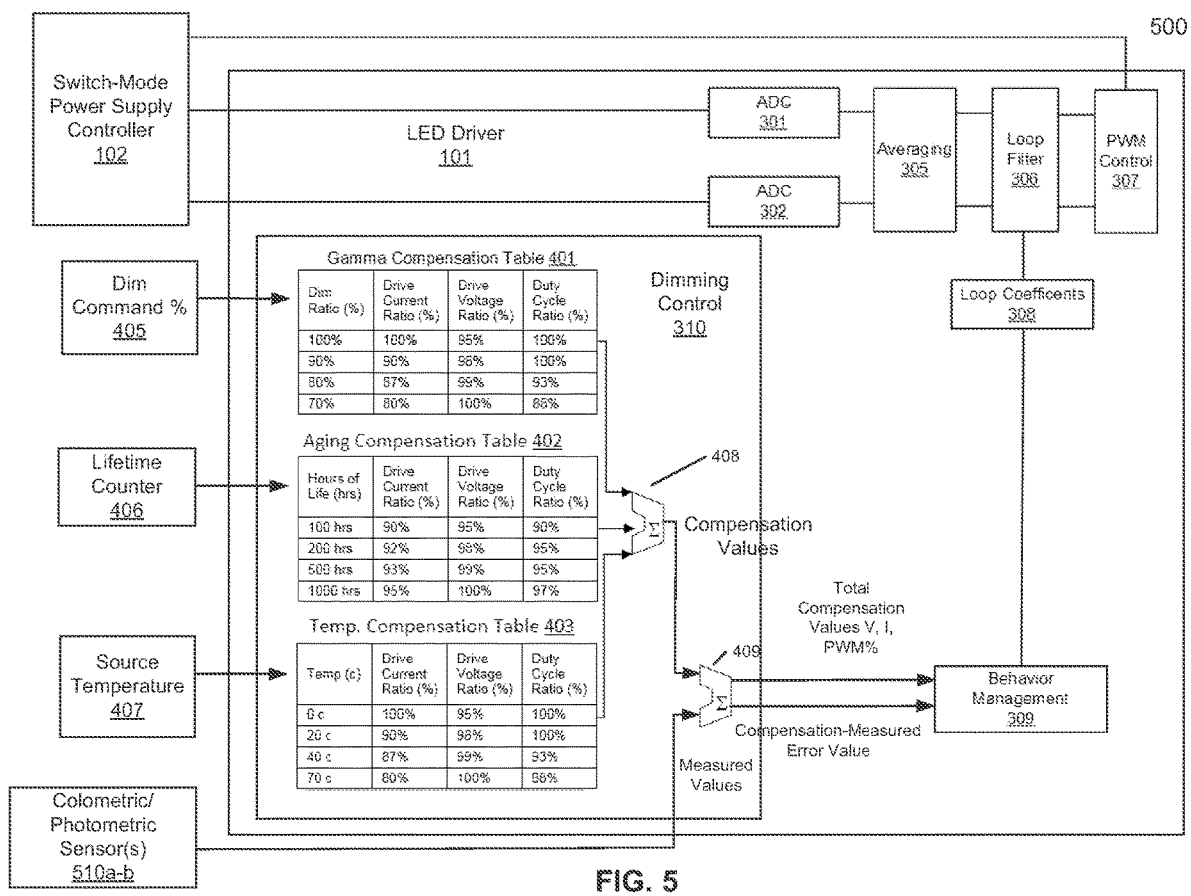
FIG. 5 is a block diagram of a dimming LED system according to one embodiment.

FIG. 5 is a block diagram of a dimming LED system 500 according to one embodiment. The dimming LED system 500 includes LED driver 101 coupled to switch-mode power supply controller 102, as described above. As shown in FIG. 5, the LED driver 101 includes ADC 301, ADC 302, averaging function block 305, control loop filter block 306, PWM control block 307, loop coefficients block 308, behavior management block 309 and dimming control block 310, as described above. ADC 301 and ADC 302 and PWM control block 307 are connected to switch-mode power supply controller 102, as described above. Dimming control block 310 includes a gamma compensation table 401, an aging compensation table 402 and a temperature compensation table 403, as described above. FIG. 5 is different from FIG. 4 in that the LED driver 101 receives a colormetric feedback, a photometric feedback, or the colormetric feedback and photometric feedback from colormetric and photometric sensors 510a-b of the LED source. The colormetric and photometric feedbacks from the LED source sensors is provided to one of the inputs of a summation block 409. The total compensation values for the drive current ratio, the drive voltage ratio and the duty cycle ratio from the summation block 408 are provided to other inputs of the summation block 409. The summation block 409 outputs total compensation values for the drive current ratio, the drive voltage ratio and the duty cycle ratio to behavior management block 309. The summation block 409 outputs a compensation-measured error value for the one or more LED parameters to the behavior management block 309.

Figure 6:
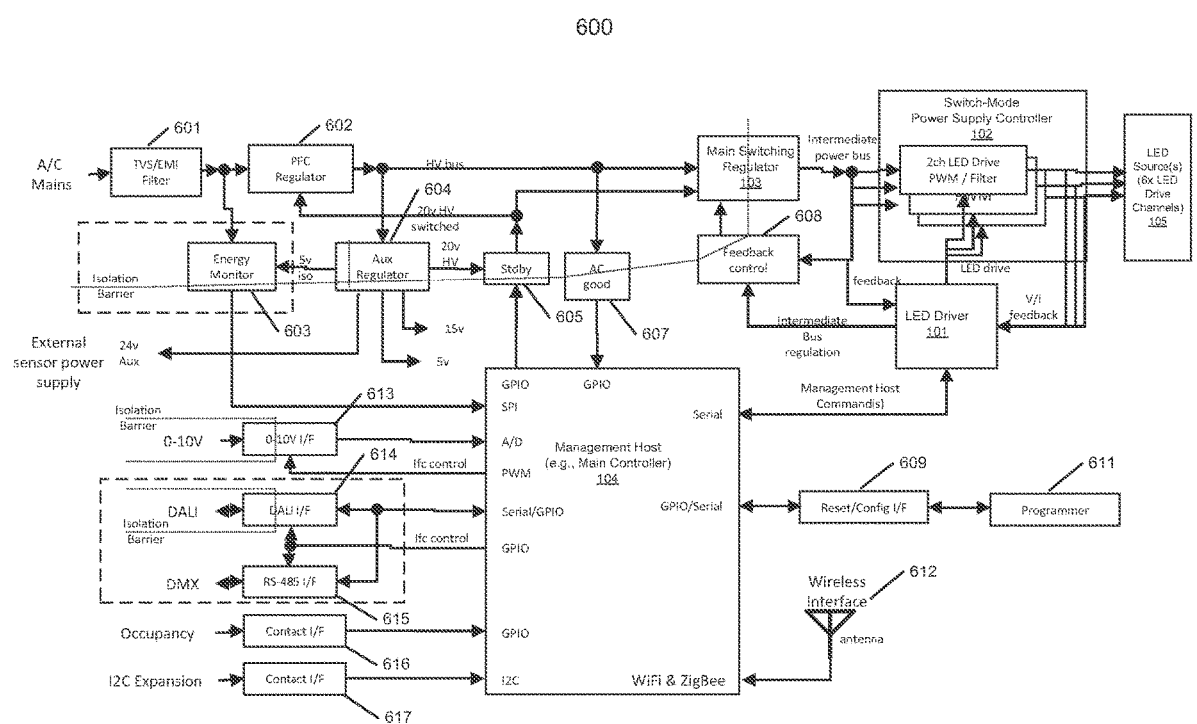
FIG. 6 is a block diagram of a dimming LED system according to one embodiment.

FIG. 6 shows a block diagram of a dimming LED system 600 according to one embodiment. The dimming LED system 600 includes LED driver 101, switch-power supply controller 102, main switching regulator 103, management host 104 and light source 105, as described above. As shown in FIG. 6, dimming LED system 600 includes aTVS/EMI filter 601 connected to a PFC regulator 602 and an energy monitor 603. An output of the PFC regulator 602 is connected to an auxiliary regulator 604 that provides an input to the energy monitor 603 and to a standby block 605. Standby block 605 provides an input to the PFC regulator 602, and main switching regulator 103. An output of the PFC regulator 602 is connected to main switching regulator 103. The output of the PFC regulator 602 is connected to management host 104 via an AC good block 607. Management host 104 receives inputs from a plurality of interfaces, such as a reset/configuration interface (IF) 609, a wireless interface 612, 0-10V IF 613, digitally addressable lighting interface (DALI) 614, DMX RS-485 IF 615, a contact IF 616 and a contact IF 617, as shown in FIG. 6. As shown in FIG. 6, a user (e.g., a programmer) 611 communicates with management host 104 via reset/configuration IF 609. Management host 104 is coupled to LED driver 101 via a bi-directional link, as shown in FIG. 6. LED driver 101 provides an input to a feedback control block 608 that is connected to the main switching regulator 103. Main switching regulator 103 provides inputs to the channels of the buck converters of the switch-mode power supply controller 102 and to the feedback control block 608. LED driver 101 is connected to drive the channels of the buck converters of the switch-mode power supply controller 102. LED driver 101 is coupled to the output of the main switching regulator 103.

Figure 7:
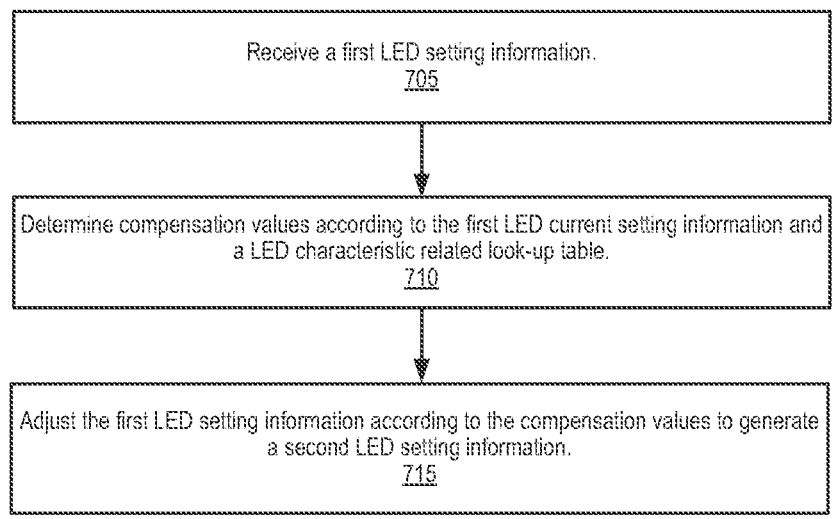
FIG. 7 is a flow chart illustrating a method for dimming an LED source according to one embodiment.

FIG. 7 is a flow chart illustrating a method to dim an LED source according to one embodiment. At operation 705 a first LED setting information is received. The first LED setting information includes first values of the LED source parameters, e.g., a drive voltage, a drive current, a drive duty cycle to dim an LED source array to a desired level. The first LED setting information is provided as a part of the input command to dim the LED source array. The first LED setting information is stored in a memory coupled to the LED driver.

At operation 710 compensation values for a drive current, a drive voltage and a drive duty cycle for the LED source array are determined according to the first LED setting information and one or more LED characteristics related look-up tables. The one or more LED characteristics related look-up tables include a gamma compensation table, an aging compensation table, and a temperature compensation table, as described above. The one or more LED characteristics related look-up tables map one or more LED parameters to at least one of a drive voltage parameter, a drive current parameter and a duty cycle parameter, as described above. An interpolation between at least two compensation values for the one or more LED parameters is performed, as described above. The one or more LED parameters include a photometric response parameter, a gamma parameter, an aging parameter, a temperature parameter, a colormetric feedback from the LED source, a photometric feedback from the LED source, or any combination thereof, as described above.

At operation 715 the first LED setting information is adjusted according to the compensation values to generate a second LED setting information. The second LED setting information is generated based on the compensation values. The second LED setting information is a part of an LED drive command that is output by the LED driver in response to the input command based on one or more LED parameters, as described above. For one embodiment, the second LED setting information includes second values of the LED source parameters, a drive voltage, a drive current, a drive duty cycle to drive the LED source to a desired brightness or a desired dimming level. For one embodiment, the second LED setting information includes a dimming ratio that is determined based on the input command and target intensities of the LED source array associated with the one or more LED parameters, as described above. An error value for the one or more LED parameters is computed, as described above.

Figure 8:
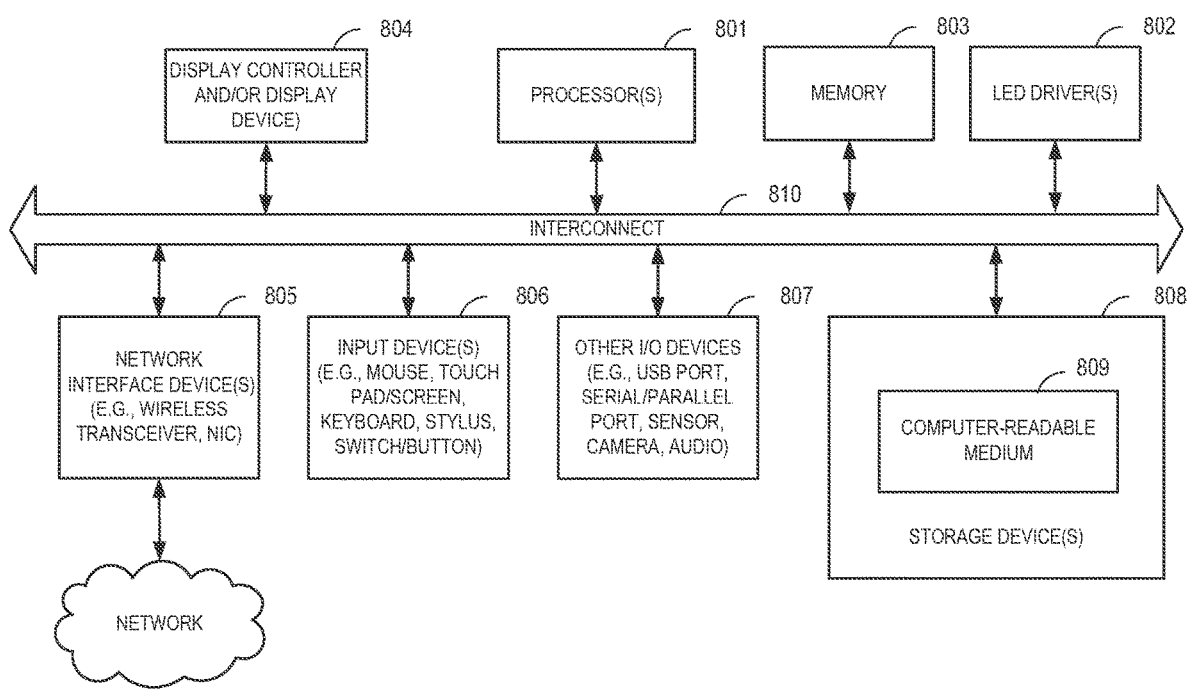
FIG. 8 is a block diagram illustrating a data processing system for dimming an LED source according to one embodiment.

FIG. 8 is a block diagram illustrating an example of a data processing system 800 that includes one or more LED drivers 802, as described herein. For one embodiment, the one or more LED drivers 802 are represented by the LED driver 101, as described with respect to any of FIGS. 1-7. For example, system 800 may represent a data processing system for performing any of the processes or methods described above in connection with any of FIGS. 1-7. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high-level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

For one embodiment, system 800 includes a processor 801, one or more LED drivers 802, a memory 803, and one or more network interface devices 805, one or more input devices 806 and other input/output devices 808 that are connected via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or other processor. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and/or steps discussed herein. System 800 may further include a graphics interface that communicates with optional graphics subsystem 804, which may include a display controller, a graphics processor, and/or a display device.

Processor 801 may communicate with one or more LED drivers 802 and memory 803. For one embodiment, memory 803 is implemented via multiple memory devices to provide for a given amount of system memory that incorporates one or more dimming commands of the one or more LED drivers 802. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801 or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Network interface device 805 may include a wireless transceiver and/or a network interface card (NIC). The wireless transceiver may be a WiFi transceiver, an infrared transceiver, a Bluetooth transceiver, a WiMax transceiver, a wireless panel assembly telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or a break thereof using any of multiple touch sensitivity technologies, including but not limited to capacitive, resistive, infrared, and surface acoustic wave technologies, as well as other proximity sensor arrays or other elements for determining one or more points of contact with the touch screen.

I/O devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). For other embodiments, however, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software embodying any one or more of the methodologies or functions described herein. Embodiments described herein may also reside, completely or at least partially, within memory 803, and/or within processor 801 during execution thereof by data processing system 800, memory 803, and processor 801 also constituting machine-accessible storage media. Modules, units, or logic configured to implement the embodiments described herein may further be transmitted or received over a network via network interface device 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the embodiments described herein. The term "computer-readable storage medium" shall accordingly be taken to include, but not be limited to, solid-state memories, and optical and magnetic media, or any other non-transitory machine-readable medium.

Components and other features described herein can be implemented as discrete hardware components or integrated in the functionality of hardware components such as ASICS, FPGAs, DSPs, or similar devices. In addition, any of the components described above in connection with any one of FIGS. 1-8 can be implemented as firmware or functional circuitry within hardware devices. Further, these components can be implemented in any combination hardware devices and software components.

Note that while system 800 is illustrated with various components of a data processing system, it is not intended to represent any particular architecture or manner of interconnecting the components; as such, details are not germane to embodiments described herein. It will also be appreciated that network computers, handheld computers, mobile phones, servers, and/or other data processing systems, which have fewer components or perhaps more components, may also be used with embodiments described herein.

In the foregoing specification, embodiments have been described with reference to specific exemplary embodiments thereof. It will be evident that various modifications may be made thereto without departing from the broader spirit and scope. The specification and drawings are, accordingly, to be regarded in an illustrative sense rather than a restrictive sense.

What is claimed is:

1. A dimming light emitting diode (LED) system, comprising:

an LED driver comprising a processor; and
a switch-mode power supply controller coupled to the LED driver to drive an LED light source array, wherein the LED driver is configured to output an LED drive command to the switch-mode power supply controller to dim the LED light source array based on one or more LED parameters, wherein the one or more LED parameters include a photometric response parameter, a gamma parameter, an aging parameter, a temperature parameter, or any combination thereof, wherein the processor is configured to receive a first LED setting, wherein the processor is configured to determine compensation values according to the first LED setting and at least the aging parameter.

2. The dimming LED system of claim 1, wherein the one or more LED parameters include at least one of a colormetric feedback from the LED source array and a photometric feedback from the LED source array.

3. The dimming LED system of claim 1, wherein the LED driver is configured to output the LED drive command based one or more tables that map the one or more LED parameters to at least one of a drive voltage parameter, a drive current parameter and a duty cycle parameter.

4. The dimming LED system of claim 1, wherein the LED driver is configured to interpolate between at least two values of the one or more LED parameters.

5. The dimming LED system of claim 1, wherein the LED driver is configured to compute an error value for the one or more LED parameters.

6. The dimming LED system of claim 1, wherein the processor is configured to generate a second LED setting based on the compensation values.

7. The dimming LED system of claim 1, wherein the switch-mode power supply controller comprises a two-channel buck converter.

8. A dimming light emitting diode (LED) driver circuit, comprising:

a memory; and
a dimming control unit comprising a processor coupled to the memory, wherein the processor is configured to output a command to drive an LED light source array based on one or more LED parameters, wherein the one or more LED parameters include a photometric response parameter, a gamma parameter, an aging parameter, a temperature parameter, or any combination thereof, wherein the processor is configured to receive a first LED setting, wherein the processor is configured to determine compensation values according to the first LED setting and at least the aging parameter.

9. The dimming LED driver circuit of claim 8, wherein the one or more LED parameters include at least one of a colormetric feedback and a photometric feedback from the LED source.

10. The dimming LED driver circuit of claim 8, wherein the memory is configured to store one or more tables that map the one or more LED parameters to at least one of a drive voltage parameter, a drive current parameter and a duty cycle parameter.

11. The dimming LED driver circuit of claim 8, wherein the processor is configured to determine a dimming ratio based on target intensities of the LED source array associated with the one or more LED parameters.

12. The dimming LED driver circuit of claim 8, wherein the processor is configured to interpolate between at least two values of the one or more LED parameters.

13. The dimming LED driver circuit of claim 8, wherein the processor is configured to determine an error value to compensate for variation of the one or more LED parameters.

14. The dimming LED driver circuit of claim 8, wherein the processor is configured to generate a second LED setting information based on the compensation values.

15. A method to dim an LED source array comprising:
receiving, by a processor, an input including a first LED setting to dim the LED source array;
outputting, by the processor, an LED drive command in response to the input based on one or more LED parameters, wherein the one or more LED parameters include a photometric response parameter, a gamma parameter, an aging parameter, a temperature parameter, or any combination thereof, wherein the processor is configured to determine compensation values according to the first LED setting and at least the aging parameter.

16. The method of claim 15, further comprising
determining, by the processor, a dimming ratio based on the input and target intensities of the LED source array associated with the one or more LED parameters.

17. The method of claim 15, wherein the one or more LED parameters include at least one of a colormetric feedback and a photometric feedback from the LED source.

18. The method of claim 15, wherein the LED drive command is output based on one or more tables that map the one or more LED parameters to at least one of a drive voltage parameter, a drive current parameter and a duty cycle parameter.

19. The method of claim 15, further comprising
performing, by the processor, an interpolation between at least two values of the one or more LED parameters.

20. The method of claim 15, further comprising
computing, by the processor, an error value for the one or more LED parameters.

21. The method of claim 15, further comprising
generating, by the processor, a second LED setting information based on the compensation values.

22. A non-transitory machine readable medium comprising instructions that cause a data processing system comprising a processor to perform a method to dim an LED source array comprising:
receiving, by the processor, an input including a first LED setting to dim the LED source array;
outputting, by the processor, an LED drive command in response to the input based on one or more LED parameters, wherein the one or more LED parameters include a photometric response parameter, a gamma parameter, an aging parameter, a temperature parameter, or any combination thereof, wherein the processor is configured to determine compensation values according to the first LED setting and at least the aging parameter.

23. The non-transitory machine readable medium of claim 22, further comprising instructions that cause the data processing system to perform operations comprising
determining, by the processor, a dimming ratio based on the input and target intensities of the LED source array associated with the one or more LED parameters.

24. The non-transitory machine readable medium of claim 22, wherein the one or more LED parameters include at least one of a colormetric feedback and a photometric feedback from the LED source.

25. The non-transitory machine readable medium of claim 22, wherein the LED drive command is output based on one or more tables that map the one or more LED parameters to at least one of a drive voltage parameter, a drive current parameter and a duty cycle parameter.

26. The non-transitory machine readable medium of claim 22, further comprising instructions that cause the data processing system to perform operations comprising
performing, by the processor, an interpolation between at least two values of the one or more LED parameters.

27. The non-transitory machine readable medium of claim 22, further comprising instructions that cause the data processing system to perform operations comprising
computing, by the processor, an error value for the one or more LED parameters.

28. The non-transitory machine readable medium of claim 22, further comprising instructions that cause the data processing system to perform operations comprising
generating, by the processor, a second LED setting information based on the compensation values.

\* \* \* \* \*